Sept. 20, 1927.

J. J. KANE 1,643,213

ELECTRIC POWER SYSTEM

Filed Oct. 14, 1920

Inventor
J. J. Kane
by
Attorney

Patented Sept. 20, 1927.

1,643,213

UNITED STATES PATENT OFFICE.

JOHN J. KANE, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

ELECTRIC POWER SYSTEM.

Application filed October 14, 1920. Serial No. 417,004.

This invention relates in general to electrical power and distribution systems, and has particular relation to devices or apparatus for regulating generators driven by prime movers, such as engines or turbines connected to supply variable electrical loads, especially where there is a tendency for the generator-driving means to operate at a speed dependent upon the load.

In certain installations, as where a steam turbine drives a generator, usually through a direct connection therewith, for supplying a variable electrical load, such as lights on a railway train or the locomotive thereof, means are necessary for regulating or limiting the speed of the turbine on the loss of a portion of the generator load, and also on an appreciable increase in the steam pressure at the turbine inlet. It will be obvious, that, if the generator were permitted to operate at a greatly increased speed on the removal of a portion of its normal load or an increase in pressure at the turbine inlet, the voltage on the lamps or other translating devices constituting the load on the generator might rise to a dangerously high value, and this is especially the case where the load comprises lamps of the incandescent type, where a comparatively small voltage variation may be highly injurious to the life of the lamps. Again, unless some means is provided for effectively limiting the speed of the generator and the turbine driving the same to a safe operating value on the removal of generator load, there is liable to be unnecessary wear and strain upon the generator and turbine, and even considerable danger to these elements of the system.

In accordance with this invention, improved means are provided for regulating the speed of the prime mover and the speed and output of the generator, the means disclosed herein constituting a modification of the means for the same general purpose disclosed in applicant's copending application Serial No. 42,104, filed July 24, 1915, and an object of the regulating means provided herein is to maintain a characteristic, such as the voltage, of the energy supplied by the generator substantially constant independently of the speed thereof or of any tendency of the prime-mover to operate at a variable speed dependent upon the load on the generator, while at the same time holding the speed of the generator and its driving means within a limiting value at which these elements can operate continuously without any harmful effects. For this regulating purpose, an artificial load is provided which takes the place of at least a portion of the electrical load removed from the generator circuit, the regulation being effected in response to variations in the speed of the generator and its driving means, this manner of regulating the set involving considerable economy as to power used for braking purposes, especially when there is a substantial load on the generator; and it also has the desirable feature that the power rating of the generator or the prime-mover need not be appreciably greater than is necessary to supply the normal or full electrical load on the generator.

It is an object of this invention to provide a system comprising a machine supplying a load of a variable character, and improved means for controlling said machine as desired independently of the load on the machine, while confining the speed of the machine to a desired safe operating value.

It is a further object of this invention to provide a system of distribution comprising a generator supplying a load of a variable character and driven by fluid-operated means which automatically tends to increase its speed on loss of load, and improved means for maintaining the voltage of the generator substantially constant or within a desired limit independently of the load on the generator, while at the same time confining the speed of the generator and its driving means to a desired limiting value.

It is a further object of this invention to provide for a system of the character described improved regulating apparatus comprising an electrically operative brake, and means for effectively energizing the brake to a degree responsive to the speed of the generator and its driving means.

These and other objects and advantages are attained by this invention, the various novel features of which will appear from the description and drawings, disclosing one or more embodiments of the invention, and will be particularly pointed out in the claims.

In the accompanying drawings.

Figure 1:
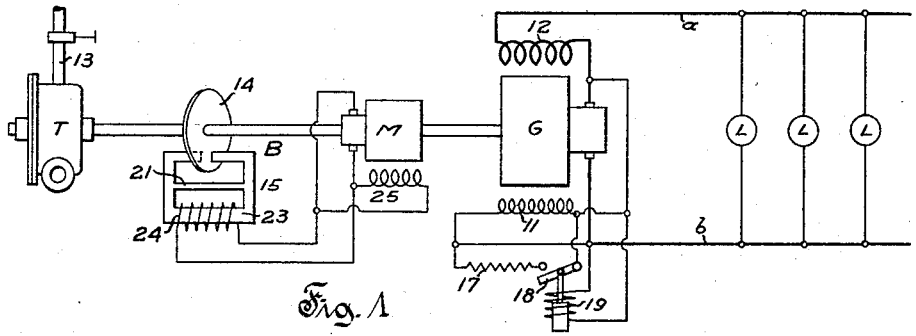
Fig. 1 is a diagrammatic showing of a system involving features of this invention.

In the embodiment of the invention disclosed in Fig. 1, a generator G is driven by a prime mover, such as a steam turbine T which is preferably mounted on the generator shaft. The shunt field of the generator is indicated at 11 and the series field at 12, the machine terminals being connected to the distribution circuit a, b, which supplies a number of elements of a variable load L which may be considered as a lamp load. The turbine T is provided with an inlet 13 of adjustable size, although, in the ordinary operation of the system, the inlet opening usually remains constant when adjusted, this adjustment depending upon the normal generator speed desired under conditions of full load on the generator, and the working pressure of the steam at the turbine inlet. This pressure may be considered as being maintained substantially constant, as by means of a reducing valve, or otherwise. A brake B is provided, the same being designed to act as an artificial load on the shaft of the generator and turbine, this brake comprising a disk 14 of conductive material mounted on the shaft and rotatable between poles of an electromagnetic field element 15.

As mentioned above, the turbine T is of a character such that, with a definite throttle setting and inlet pressure, the speed thereof tends to vary inversely as the load. While the system of Fig. 1 contemplates some variation in the speed of the turbine and generator, nevertheless, the brake B and its energizing means are of a character to limit this speed variation to a desired extent, this permissible speed variation being utilized to cause the load on the turbine to be of such a value as insures maintaining the speed within the desired limit at all times.

While the regulation of the generator field so as to secure substantially constant voltage in spite of speed variations may be secured to a greater or less degree, as desired, through the cumulative series winding 12, nevertheless, a voltage-responsive regulating device may be provided in addition. This additional regulator may comprise a resistance 17 in shunt to the field 11, the circuit through the resistance being normally open and being closable by an oscillating switch or circuit-closer 18 actuable by a voltage-responsive magnet 19 to maintain the generator voltage substantially constant. This voltage regulating means acting on the shunt field may, in itself, be sufficient to maintain constant voltage without the series field.

The electromagnetic field element 15 comprises two spaced polar portions, as indicated, in the air-gap between which the conductive disk 14 is rotatable. The magnetic circuit around the air-gap is closed through two parallel paths, the path 21 being of relatively reduced cross-sectional area so as to provide for its magnetic saturation under predetermined conditions of operation, and the path 23 being of normal cross-sectional area, that is, being unsaturable under any ordinary operating conditions. The field element is energized by a winding 24 disposed upon the unsaturable portion 23 of the magnetic circuit. This winding 24 is supplied from an exciting magneto or generator M, preferably mounted upon the shaft of the turbo-generator, and in any case being so arranged that its speed varies directly as the speed of the turbine. As indicated, this magneto is self-excited by a shunt field winding 25. With such an arrangement, the voltage at the magneto terminals, and hence the energizing effect produced by the winding 24, varies directly as the speed of the magneto and the turbine driving the same; and, due to the fact that the winding 25 is of the shunt type and supplied from the magneto terminals, there are two variable elements which operate to increase the voltage of the magneto as the speed thereof increases. In other words, there is an increase in voltage due to increase in speed and a further increase due to the increased energizing effect of the winding 25. This increase in voltage at the terminals of the magneto M, during the predetermined speed variation of the turbine that is present between the upper and lower limits of load on the generator G, is utilized for varying the retarding effect of the brake B, this braking effect being such as takes the place of the greater portion of the load removed from the circuit of the generator G.

Assume that the system is operating under conditions of normal or full electrical load on the generator G. At this time, through the effect of the shunt winding 11, with its voltage-responsive regulator and the series winding 12, the generator voltage is maintained constant even though there may be slight variation in the speed of the turbine and generator. At this time, the magneto M, being excited by its shunt winding 25, is operative to excite the winding 24 only to a degree sufficient to cause the latter to produce an amount of magnetic flux that approximately saturates the shunt path 21. Under these conditions of operation, substantially all of the flux generated in the path 23 of the electromagnet threads the path 21, only a comparatively small and ineffective portion of the total flux passing across the air-gap of the magnet and through the conductive disk 14. Under these conditions of operation, the brake B exerts no appreciable braking effect upon the turbine shaft.

Assume now that a portion of the lamp load is removed from the generator circuit. The effect of this loss in generator load is to cause the turbine and generator to speed up, the regulator 19 along with the series winding 12 being sufficient to maintain the voltage on the generator the same as existed under conditions of full load. On increase in the speed of the turbine shaft, the speed of magneto M increases, the effect thereof being a considerably increased voltage at its terminals, this voltage increase being reflected in the increased energization of the winding 24.

In view of the fact that the path 21 of the electromagnet 15 was saturated at the voltage produced by the magneto under conditions of full load on the generator G, the increased voltage of the magneto is utilized substantially wholly in producing flux that passes across the air-gap and through the conductive disk 14, thus producing a braking effect upon the turbine shaft which is sufficient to hold the speed increase to a value considerably lower than what it would be were this braking arrangement not provided.

As the load on the generator decreases to zero, the voltage at the generator terminals is maintained constant and there is a continual increase in speed of the turbo-generator and the magneto M. This increase in speed causes an increase in the voltage of the magneto to its maximum value, predetermined by the design thereof and the maximum speed desired under conditions of no load on the generator G, and there is a consequent increased braking effect exercised by the brake B, thus holding down the speed of the turbine to a desired limiting value.

It will be apparent that, as the electrical load is removed from the generator, there is substituted therefor as an effective load upon the turbine, an increase in the load due to the magneto M, an increase in the braking effect on the turbine shaft due to the brake B, and also an increase in the windage loss of the various rotating elements due to the higher operating speeds. These losses may be substantially the equivalent of the load removed from the generator circuit, so that it may be considered that there is a fairly constant total load on the turbine at all times.

By proper design of the generator, the magneto M, and the brake B, the increase in the turbine speed between that corresponding to full load on the generator and no load thereon, may be limited to a relatively small amount say from 10% to 25% or even less, of the full load speed. By designing the system so that this permissible speed variation is utilized for controlling the regulation of the system, a minimum size of generator and turbine may be utilized, for the generator losses for braking purposes under conditions of full load on the generator are a minimum, as distinguished from certain prior art apparatus where the total energy supplied to the brake is a maximum under conditions of full load upon the generator, thus requiring greater capacity or power rating of the generator and turbine.

It will be apparent that the magneto M, may, if desired, be excited from any desired source, such as a battery or the terminals of the generator G. Likewise, under conditions of separate excitation, the magneto may readily be of alternating current type.

Figure 2:
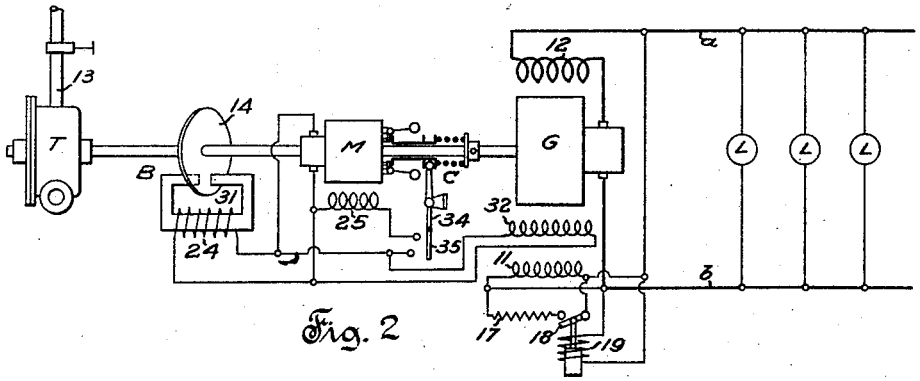
Figs. 2 and 3 are diagrammatic views showing modifications of the system of Fig. 1.

In the system disclosed in Fig. 2, the generator may be the same as that of Fig. 1, as shown, or the series winding may be omitted and the shunt winding with its regulator may be relied upon wholly to maintain constant voltage upon the generator circuit. In order to decrease the amount of power consumed by the brake B under conditions of normal or full load on the generator, the system is so designed that the magneto M does not furnish any appreciable power to the brake when the speed of the set is below that corresponding to full load on the generator; and the field of the brake may be in the form of a simple magnetic element 31 having an air-gap between opposed polar portions, and the energizing winding 24.

As an additional element in controlling the voltage of the generator G, there is provided a field winding 32 supplied from the terminals of the magneto M, this field winding being designed to oppose the energizing effects produced by the voltage and series windings. Thus as load is removed from the generator and the speed thereof consequently rises, this winding 32 has an increasing effect in reducing the effective field excitation of the generator, thus assisting in holding down the voltage thereof in spite of variations in speed.

During operation of the set at speeds up to the value corresponding to normal or full load upon the generator G, the winding 24 may be substantially unenergized, there being no requirement at this time for the exercising of a braking effect upon the turbine shaft. This result or operation may be secured by having the circuit of the magneto M, either the armature or the field circuit, open at this time. In the particular embodiment of the invention shown, the armature circuit is permanently closed through the winding 24, and the field circuit 25 is normally open and is closable by a switch element 35 which is actuated through a speed responsive device C associated with the armature of the magneto or the turbine shaft, the switch element being operable through an element 36 when the speed of the turbine rises to a point slightly above that corresponding to full load upon the generator. In other words, as a portion of the generator load is removed, causing an increase in speed of the turbo-generator above normal, the centrifugal device C becomes effective to close the circuit of field winding 25, and thus render the brake B more or less effective, depending upon the voltage of the magneto M, for the purpose of braking the turbine shaft. As described in connection with the system of Fig. 1, during operation at speeds corresponding to generator loads between full and zero values, the braking effect exercised by the brake B of Fig. 2 varies directly as the turbine speed.

The voltage on the generator G may be readily maintained constant by the means described during the variation in load on the generator, and the incidental variation in speed of the set may be limited to any desired amount, say 15%, this variation in speed being utilized for effecting the desired control of the turbine to prevent excess speed thereof.

Figure 3:
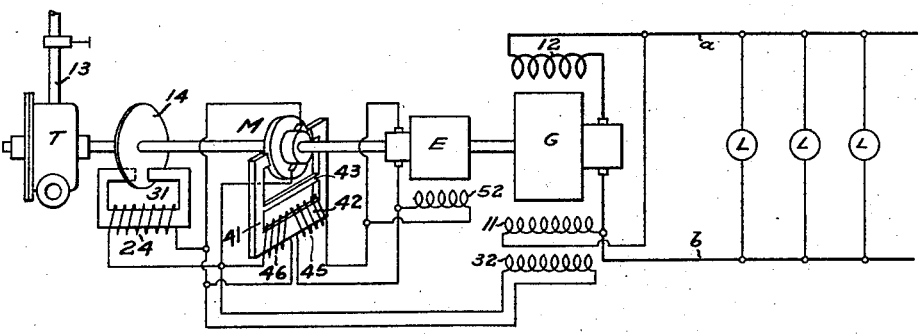

In accordance with the disclosure of Fig. 3, the brake B is of the same form as that of the system of Fig. 2, and the generator G is provided with both shunt and series windings, as shown in Fig. 1, and also with a bucking winding 32, as shown in Fig. 2, the latter winding being supplied by the magneto M.

In order to provide economy in the amount of power utilized, that is, to further reduce the required total power or rating of the turbine T under conditions of normal or full load on the generator G, the field element 41 of the magneto M may be of a special type. As shown, the armature of the magneto operates between spaced polar portions which are connected by parallel magnetic paths 42 and 43. The path 43 is of reduced cross-sectional area so that it may readily become magnetically saturated under certain operating conditions, while the path 42 is of normal cross-sectional area and is designed to remain unsaturated under any ordinary operating conditions. The main path 42 is excited by a winding 45 supplied from a separate exciter E, preferably mounted upon the turbine shaft, and a shunt winding 46, preferably superposed on the winding 45 and supplied from the terminals of the magneto M. The exciter E may have a field winding supplied from a separate source, such as the generator G, or a shunt winding 52, or both windings.

Under conditions of full load on the generator G, substantially all the flux produced by the winding 45 returns through the path 43, and no effective flux passes through the air-gap and the armature of the magneto; and thus, no effective voltage is produced at the terminals of the magneto. As the generator load is reduced, and consequently the speed of the turbine is increased, the magnetic flux produced by the winding 45 is sufficient to create an appreciable flux across the air-gap of the field element and the armature of the magneto, resulting in the production of a substantial voltage at the magneto terminals. The winding 46 is thus rendered effective to produce flux which is cumulative relative to the flux produced by the winding 45, thus forcing greater and greater amount of flux to pass through the armature of the magneto. The general effect is to cause the winding 24 of the brake B to produce a substantial energizing effect upon the brake, and thus cause the exertion of a substantial braking effect by the latter. As the load on the generator varies and the speed thereof consequently varies, the effective voltage at the terminals of the magneto M and the retarding effect of the brake B is accordingly varied, the general effect being the maintenance of the required load on the turbine T to prevent the speed of the latter from rising beyond a predetermined safe value.

It will be apparent that by proper design of the various elements of these systems the desired braking effect may be produced on the turbine T to hold the speed of the latter within any desired limits during variation of the generator load from zero to its maximum value. Further, there is a minimum loss of power for braking purposes when the load on the generator is maximum, this resulting in that the generator and turbine may be of minimum size to take care of the maximum electrical load requirements of the system. Again, the desired regulation of the system may be secured without the necessity of controlling devices having relatively movable parts that may need adjustment or may get out of order.

It will be apparent from the disclosure as to the various systems described above, that in each case there is provided a system involving a prime mover whose speed tends to vary in accordance with the load thereon and supplying a generator or other variable load, and automatically-acting means for insuring effective limitation of the speed of the turbine to a safe operating value under all conditions of load on the generator or equivalent element of the system. Further, it will be apparent that this control of the driving element is secured independently of the electrical circuit of the generator or other driven element, the permissible speed variation alone being utilized to secure the desired regulation of the system. It will be further apparent that a system is provided wherein a prime mover drives a generator supplying a variable load, and the voltage of the generator is maintained substantially constant independently of variations in the load thereon, and the speed of the turbine is limited to a safe operating value under all conditions of generator load.

It should be understood that it is not desired that the invention claimed be limited to the exact details of construction shown and described, for obvious modifications will occur to a person skilled in the art.

It is claimed and desired to secure by Letters Patent:

1. In combination, a generator having means for maintaining the voltage thereof substantially constant in spite of variations in the generator speed, means for driving said generator, an electromagnetically-actuated brake for said generator-driving means, and means for effectively energizing said brake to a degree that varies as the speed of said generator.

2. In combination, a generator having means for maintaining the voltage thereof substantially constant in spite of variations in the generator speed, means for driving said generator, an electromagnetically-actuated brake for said generator-driving means, energizing means for said brake, and speed-responsive means for causing the effective energization of said brake to vary from a minimum when the generator is operating at a speed corresponding to full load thereon to a maximum when the generator is operating at a speed corresponding to no load thereon.

3. In combination, a generator having means for maintaining the voltage thereof substantially constant in spite of variations in the generator speed, means for driving said generator, an electromagnetically-actuated brake for said generator-driving means, and energizing means for said brake, said energizing means comprising a source of electrical energy whose voltage varies as the speed of said generator and operative to cause the effective energization of said brake to vary directly as the speed of said generator.

4. In combination, a generator having means for maintaining the voltage thereof substantially constant in spite of variations in the generator speed, means for driving said generator, an electromagnetically-actuated brake for said driving means, and energizing means for said brake, operative to cause the braking effect thereof to vary directly as the speed of said generator, said energizing means comprising an energizing winding for the brake, and a shunt-wound, variable voltage source of energy for supplying said winding.

5. In combination, a compound-wound, constant voltage generator, means for driving said generator, an electromagnetically-actuated brake for said generator-driving means, and energizing means for said brake for causing the energizing effect of said brake to vary directly as the speed of said generator and its driving means, said energizing means comprising a variable voltage source of electrical energy.

6. In combination, a prime mover having a tendency to operate at a speed dependent upon its load, a generator driven thereby and having means for maintaining its voltage substantially constant in spite of variations in speed, an electromagnetically-actuated brake for said prime-mover, and energizing means for said brake effective to insure the production of no appreciable braking effect while the speed of said generator is below that corresponding to full generator load and to cause the production of a braking effect that varies as the speed of said generator for generator speeds above that corresponding to full generator load, said energizing means comprising an electromagnetic device including a saturable magnetic path.

7. In combination, a constant voltage generator having a differential field winding, a separate source of variable voltage for energizing said differential field winding, means for driving said generator and said separate source, and means for producing a braking effect on said generator-driving means that varies directly as the speed of said generator and its driving means, said means comprising an electromagnetically-actuated brake for said generator-driving means.

8. In combination, a generator, means for preventing the voltage of said generator from varying directly as the speed thereof and comprising a differential field winding, a separate source of variable voltage for supplying said differential winding, means for driving said generator and said separate source, an electromagnetically-actuated brake for said generator-driving means, and an energizing winding for said brake supplied from said separate source, said separate source including energizing means effective to cause the voltage of said separate source to be substantially zero when said generator is operating at a speed corresponding to full load on said generator and to vary directly as the speed of the generator for all higher speeds thereof.

9. In combination, a constant voltage generator having a differential field winding supplied from a separate source of variable voltage, a variable speed driving means for said generator, an electromagnetically-actuated brake for said generator-driving means, and energizing means for said brake operable to insure the production of no appreciable braking effect while the speed of said generator corresponds to full load thereon and to cause the production of a braking effect that varies as the speed of said generator for speeds thereof above that corresponding to full load, said energizing means comprising a magnetic device having a saturable magnetic path, and said differential winding being ineffective to cause appreciable influence on the energization of said generator when the speed thereof corresponds to full load thereon and being effective in response to higher generator speeds to cause a variable influence on the energization of said generator.

10. A variable speed, constant voltage generator connected to supply energy to a variable load, means for driving said generator, the speed of said driving means tending to vary with variation in the load on said generator, and means for controlling the speed of said driving means, said controlling means comprising a disk of conductive material mechanically connected to the shaft of said generator, and means for producing a magnetic field through said disk which varies as the speed of said generator and which is independent of electrical characteristics of said generator.

11. A generator connected to supply energy to a variable load, means for driving said generator, the speed of said driving means tending to vary with variation in the load on said generator, and means for controlling the speed of said driving means, said controlling means comprising a disk of conductive material mechanically connected to the shaft of said driving means, and means independent of the circuit of said generator for producing a magnetic field through said disk which varies from a value ineffective to produce appreciable braking action under conditions of full load on said generator to a value sufficent to produce a maximum braking effect under conditions of no load on said generator.

12. In combination, an electric generator including field and armature windings and connected to supply a variable load, means responsive to a characteristic of the operation of said generator for controlling the voltage thereof, said means exercising its controlling effect through variation in the effective energization due to said field winding and independently of the load on said generator, a magnetic drag for said generator, and means operative to cause said drag to exercise a breaking effect that varies as the speed of said generator.

13. In combination, a variable speed electric generator having means for maintaining its voltage substantially constant, a supply circuit connected thereto, a variable load for said supply circuit, a magnetic drag for said generator, and energizing means for said drag independent of the generator circuit for causing the breaking effect of said drag to vary as the speed of said generator.

14. In combination, a turbo-generator set comprising a turbine, and a generator directly connected to the shaft of said turbine and operative at a speed dependent upon its load, a supply circuit connected to said generator, a variable working load for said supply circuit, and means for applying to the turbine shaft an artificial load that varies directly as the speed of said turbine, said means comprising a magnetic drag having its energizing winding independent of the circuit of said generator.

15. A variable speed generator connected to supply a variable load, and an electromagnetic brake for said generator having an energizing winding supplied from a source independent of the circuit of said generator and carrying current that varies directly as the speed at which said generator operates, and means for causing said brake to be ineffective to cause substantial braking action under conditions of normal load on said generator and to be automatically rendered effective for braking purposes on an increase in speed of said generator corresponding to a removal of a portion of the normal load thereon.

16. In combination, a generator connected to supply a variable load, means for driving said generator at a variable speed dependent upon the load thereon, said generator having means for maintaining substantially constant a characteristic of the energy supplied thereby in spite of variations in the load or speed thereof, and means for controlling the load on said generator-driving means, said controlling means including an electromagnetic brake having energizing means effective to cause the brake to exercise a retarding effect upon said driving means which varies as the speed thereof.

17. In combination, a turbo-generator set comprising a turbine and a generator having means for maintaining substantially constant a characteristic of the energy supplied thereby in spite of variations in the load thereon or the speed thereof, and means for controlling the load on said turbine, said controlling means including an electromagnetically-actuated brake comprising a conductive disk mechanically connected to the turbine shaft and energizing means therefor, said means being independent of the generator circuit, and said controlling means being substantially ineffective to cause breaking action under conditions of full load on said generator and effective to cause a braking action that varies directly as the variation of said load from full load value.

18. In combination, a generator, a prime-mover for driving said generator and having a tendency to drive said generator at a speed that varies directly as the load on the generator, an electromagnetically-actuated brake for said prime mover including energizing means effective to cause the production of a braking effect on said prime-mover that varies as the speed of said prime-mover above a predetermined value and limits said speed to a safe operating value under all conditions of variable load on said generator, said energizing means being independent of said generator circuit.

19. A generator connected to supply a variable load, means for driving said generator, the speed of said driving means tending to vary with variations in the load of said generator, and means for controlling the speed of said driving means so as to cause the exertion of a variable braking effect whose substantial variations are as the speed of said driving means only above a definite value thereof, said controlling means comprising an electromagnetically actuated braking device having energizing means independent of the circuit of said generator.

20. In combination, an electrical generator adapted to supply a variable load, means for driving said generator, the speed of said driving means tending to vary with variations in load thereon, means for regulating the voltage of said generator, said regulating means comprising a source of direct current whose voltage varies directly with the speed of said generator for speeds of the latter only above a predetermined value, and an electromagnetically-actuated brake for said driving means, the energizing winding of said brake being supplied from said variable voltage direct current source.

21. In combination, an electrical generator adapted to supply a variable load, means for driving said generator, the speed of said driving means tending to vary with variations in load thereon, means for regulating the voltage of said generator, said regulating means comprising a source of direct current whose voltage varies directly with the speed of said generator for speeds thereof only above a predetermined value, and a de-energizing winding on the field of said generator supplied from said variable voltage direct current source.

22. In combination, an electrical generator adapted to supply a variable load, means for driving said generator, the speed of said driving means tending to vary with variations in load thereon, means for regulating the voltage of said generator, said regulating means comprising a source of direct current whose voltage varies directly with the speed of said generator for speeds thereof only above a predetermined value, an electromagnetically-actuated brake for said driving means, the energizing winding of said brake being supplied from said variable voltage source, and means responsive to said variable voltage source for exercising a check on voltage increase of said generator that varies as the speed thereof above said predetermined value.

23. In combination, an electrical generator operable at a variable speed and adapted to supply a variable load, means for driving said generator, and means for producing a check on voltage increase of said generator only above a predetermined value, said means exercising its controlling effect through variation in the energization of the field of said generator, and means for producing a braking effect on the shaft of said generator which varies as the speed thereof only above a predetermined value.

24. In combination, an electrical generator adapted to supply a variable load, means for driving said generator, the speed of said driving means tending to vary with variations in load thereon, and means for regulating the voltage of said generator, said regulating means comprising a direct current generator, and energizing means therefor effective to produce appreciable voltage at the terminals of said second generator only at speeds of said first generator above a predetermined normal operating value.

25. In combination, an electrical generator adapted to supply a variable load and comprising a main energizing winding of the self-excited type and an auxiliary energizing winding, said windings having differential energizing effects on said generator, means for driving said generator, and means for causing the energization of said auxiliary winding to vary in response to a characteristic of the operation of said generator only above a predetermined definite value.

26. In combination, an electrical generator adapted to supply a variable load and comprising differentially arranged energizing windings having differential energizing effects on said generator, variable speed driving means for said generator, an auxiliary generator for supplying one of said differentially arranged windings, and means for causing the energizing effects of said latter winding to vary directly as but disproportionately to the speed of operation of said driving means.

27. In combination, an electrical generator adapted to supply a variable load and having a main field winding of the self-excited type, and means for controlling said generator, said controlling means comprising an auxiliary generator, and means for controlling the operation of said auxiliary generator to cause the same to supply an electromotive force proportional to a characteristic of the operation of said first generator, and an auxiliary energizing winding on said first generator arranged in differential relation with respect to said main field winding and supplied by said auxiliary generator, and additional regulating means for said first generator responsive to the electromotive force produced by said auxiliary generator.

In testimony whereof, the signature of the inventor is affixed hereto.

JOHN J. KANE.